US009415536B2

(12) United States Patent
Fideu et al.

(10) Patent No.: US 9,415,536 B2
(45) Date of Patent: Aug. 16, 2016

(54) APPARATUS AND METHOD FOR PRODUCING A COMPOSITE MATERIAL AIRCRAFT COMPONENT

(71) Applicant: Airbus Operations GmbH, Hamburg (DE)

(72) Inventors: Paulin Fideu, Hamburg (DE); Hauke Seegel, Hamburg (DE); Claus Fastert, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 305 days.

(21) Appl. No.: 14/466,566

(22) Filed: Aug. 22, 2014

(65) Prior Publication Data
US 2015/0266220 A1    Sep. 24, 2015

(30) Foreign Application Priority Data

Aug. 26, 2013 (EP) .................................... 13181694

(51) Int. Cl.
| *B29C 35/02* | (2006.01) |
| *B29C 45/73* | (2006.01) |
| *B29C 33/02* | (2006.01) |
| B29C 70/48 | (2006.01) |
| B29C 35/00 | (2006.01) |
| B29L 31/30 | (2006.01) |

(52) U.S. Cl.
CPC ............. *B29C 45/7312* (2013.01); *B29C 33/02* (2013.01); *B29C 35/007* (2013.01); *B29C 70/48* (2013.01); *B29L 2031/3076* (2013.01)

(58) Field of Classification Search
CPC ..................................................... B29C 35/007
See application file for complete search history.

(56) References Cited

U.S. PATENT DOCUMENTS 4,338,068 A * 7/1982 Suh ..................... B29C 45/7331
249/78
5,358,211 A   10/1994 Sterett
(Continued)

FOREIGN PATENT DOCUMENTS

| CN | 1906084 A | 1/2007 |
| DE | 3103890 C1 | 11/1982 |

(Continued)

OTHER PUBLICATIONS

European Search Report Dated Jan. 30, 2014.

*Primary Examiner* — Jill Heitbrink
(74) *Attorney, Agent, or Firm* — Greer, Burns & Crain, Ltd.

(57) ABSTRACT

An apparatus for producing a composite material aircraft component comprises a mold having a receiving space adapted to accommodate a plastic material. A heating device is adapted to supply heat to the mold in order to heat the plastic material accommodated within the receiving space of the mold. The apparatus further comprises a plurality of heat pipes, each heat pipe having a first end which is in thermal contact with a heat source and a second end which is in thermal contact with the receiving space of the mold, such that the plastic material accommodated within the receiving space is supplied with heat transferred to the receiving space from the heat source via the plurality of heat pipes.

14 Claims, 1 Drawing Sheet

(56) References Cited

U.S. PATENT DOCUMENTS

| | | | |
|---|---|---|---|
| 5,445,510 A | 8/1995 | Jackson, Jr. | |
| 5,603,871 A | 2/1997 | Koseko et al. | |
| 2004/0130072 A1* | 7/2004 | Sekido | B29C 70/443 264/408 |
| 2007/0284074 A1 | 12/2007 | Morooka et al. | |
| 2012/0267828 A1* | 10/2012 | Halford | B29C 35/0288 264/327 |
| 2012/0280415 A1* | 11/2012 | Halford | B29C 35/0288 264/40.1 |
| 2013/0040012 A1* | 2/2013 | Sugie | B29C 33/02 425/404 |
| 2015/0104536 A1* | 4/2015 | Hertle | B29C 70/44 425/388 |

FOREIGN PATENT DOCUMENTS

| | | |
|---|---|---|
| DE | 102004001078 A1 | 7/2005 |
| DE | 102007062111 A1 | 7/2009 |
| DE | 102009045597 B3 | 10/2009 |
| DE | 102010050740 C1 | 11/2010 |
| JP | H0591820 A | 4/1993 |
| JP | 05-19820 U * | 12/1993 |
| JP | 2005138366 A | 6/2005 |
| WO | 2005120803 A1 | 12/2005 |
| WO | 2007038385 A2 | 4/2007 |
| WO | 2012062441 A2 | 5/2012 |
| WO | 2013007458 A2 | 1/2013 |

* cited by examiner

APPARATUS AND METHOD FOR PRODUCING A COMPOSITE MATERIAL AIRCRAFT COMPONENT

CROSS-REFERENCES TO RELATED APPLICATIONS

This application claims priority to European Patent Application No. 13 181 694.4 filed on Aug. 26, 2013, the entirety of which is incorporated herein by reference.

BACKGROUND OF THE INVENTION

The invention relates to an apparatus and a method for producing a composite material aircraft component.

In aircraft construction, efforts are being made to use as load-bearing components increasingly components which are composed wholly or partly of fiber-reinforced composite materials, for example carbon fiber-reinforced plastics (CFRP). For example, DE 10 2007 062 111 A1 describes a transverse support structure which is composed of carbon fiber-reinforced plastic and serves to support the individual panels of an aircraft floor system for separating a passenger cabin from a cargo compartment arranged below the passenger cabin. Furthermore, it is known, for example from DE 10 2004 001 078 A1 or CN 1906084 A, to provide aircraft fuselage segments with a skin which is designed with a sandwich construction and made of fiber-reinforced composite materials.

For producing aircraft components from fiber-reinforced composite materials, a Resin Transfer Molding (RTM) process may be used which involves the injection of a thermoset plastic material, for example an epoxy resin material, into a mold. Reinforcing fibers in the form of single fibers, fiber pre-wovens or fiber prepregs may be arranged inside the mold prior to the injection of the thermoset plastic material. Within the mold, the thermoset plastic material is cured under elevated pressure and/or elevated temperature so that a composite material with a matrix made of cured thermoset plastic and reinforcing fibers embedded in the matrix is obtained. In order to exhibit the thermoset plastic material received within the mold to the desired elevated pressure and/or elevated temperature, the mold may be disposed between heated press plates.

Alternatively, an autoclave process may be used to manufacture fiber-reinforced composite material aircraft components. In particular large structural components such as aircraft fuselage or wing parts may be produced from multilayer laminates which are built up from fiber prepregs. The fiber prepregs, which comprise a woven fabric or laid scrim of reinforcing fibers provided with a surface layer made of an uncured thermoset plastic material, for example an epoxy resin material, are arranged in a mold which in turn is received in an autoclave. The thermoset plastic material deposited on the surfaces of the fibers then is cured in an autoclave cycle under pressure and/or elevated temperature.

Finally, DE 10 2010 050 740 C1 and WO 2012/062441 A2 describe composite material aircraft components comprising a matrix made of a thermoplastic material and reinforcing fibers which are embedded in the matrix material. The aircraft components are manufactured by introducing a stack of semi-finished product layers into a compression mold and then applying a pressure to the stack of semi-finished product layers. The stacked semi-finished product layers are heated to a temperature of 300° C. to 500° C. while pressure is being applied.

The invention is directed at the object of specifying an apparatus and a method for efficiently producing a high quality composite material aircraft component.

SUMMARY OF THE INVENTION

This object may be achieved by an apparatus having the features of one or more embodiments herein and by a method having the features of one or more embodiments herein.

An apparatus for producing a composite material aircraft component comprises a mold having a receiving space adapted to accommodate a plastic material. The plastic material may, for example, be thermoset plastic material such as a resin material, in particular an epoxy resin, which may be introduced into the receiving space of the mold in the liquid state. Alternatively, the plastic material may be a thermoplastic material, such as, for example, polyetherketone, polyphthalamide or polyphenylene sulphide. The mold may comprise at least two sections which may be movable relative to each other in such a way that a molded padding may be removed from the receiving space of the mold. The mold may, however, also be designed for use in an open mold process and may comprise only one section into which the plastic material may be introduced.

The receiving space of the mold may further be adapted to accommodate reinforcing fibers which, in the final composite material aircraft component manufactured by means of the apparatus, are embedded in a matrix made of the plastic material. The fibers may be introduced into the receiving space of the mold in the form of single fibers, fiber pre-wovens or prepregs. In case a fiber prepreg is accommodated in the receiving space of the mold, the plastic material may be provided in the form of a surface layer applied onto the reinforcing fibers of the fiber prepreg. It is, however, also conceivable to inject additional plastic material into the receiving space of a mold which already accommodates a fiber prepreg.

The apparatus for producing a composite material aircraft component may further comprise a heating device which is adapted to supply heat to the mold in order to heat the plastic material accommodated within the receiving space of the mold. In case the plastic material is a thermoset plastic material, a curing reaction induced by the heat supplied to the mold by the heating device renders the thermoset plastic material dimensionally stable such that molded padding having the desired shape can easily be removed from the mold. In case the plastic material is a thermoplastic material, heating the material allows the material to be brought into the desired shape.

Finally, the apparatus may also comprise a plurality of heat pipes. Each heat pipe may comprise a closed hollow tube made of a thermally conductive material such as, for example, a metal. A working medium such as, for example, water may be contained in the particularly hermetically sealed tubes of the heat pipes. Each heat pipe has a first end which is in thermal contact with a heat source and a second end which in thermal contact with the receiving space of the mold. Hence, the plastic material accommodated within the receiving space of the mold is supplied with heat transferred to the receiving space from the heat source via the plurality of heat pipes. For example, the heat transferred to the heat pipes from the heat source may cause the working medium contained in the tubes of the heat pipes to be transferred from a liquid state of aggregation to a gaseous state of aggregation. In particular, the working medium contained in the tubes of the heat pipes in the region of the first end of the heat pipes which is thermal contact with the heat source may evaporate due to the heat provided by the heat source. Due to the pressure increase caused by the evaporation of the working medium, the gaseous working medium may flow in the direction of the second end of the heat pipes where it condenses upon transferring heat to the receiving space of the mold and thus the plastic material accommodated within the receiving space of the mold.

In the apparatus for producing a composite material aircraft component, the use of heat pipes allows a more homogeneous heating of the receiving space of the mold. Hence, a more homogeneous heating of the plastic material accommodated within the receiving space of the mold is made possible. In case the plastic material is a thermoset plastic material, a particularly homogeneous and reliable curing of the thermoset plastic material is thus made possible. High quality composite material aircraft components can thus be obtained. Further, cycle times can be reduced, since it is no longer necessary to maintain the plastic material within the receiving space of the mold until homogenous heating of the entire mold is ensured.

In one embodiment of the apparatus for producing a composite material aircraft component, the mold may be disposed between press plates. In particular, the mold may be sandwiched between an upper press plate and a lower press plate, wherein either only one press plate or both press plates may be driven by a suitable drive mechanism which allows the press plate(s) to move in the direction of the mold so as to apply a pressure onto the mold. The mold may be provided with an injection channel which allows the plastic material to be injected into the receiving space of the mold. The size, the shape and the position of the injection channel formed in the mold may be designed as required by the desired shape of the composite material aircraft component to be manufactured. If necessary, the mold may also be provided with a plurality of injection channels. An apparatus comprising a mold which is disposed between press plates and which is provided with an injection channel is particularly suitable for use in an RTM process.

In a further embodiment of the apparatus for producing a composite material aircraft component, the mold may be disposed in an autoclave or an oven. The autoclave may comprise a hermetically sealable pressure container, wherein a suitable support structure for supporting the mold may be provided. A compressor may be used so as to pressurize the pressure container of the autoclave. For example, during operation of the autoclave, a pressure of up to 10 bar and a temperature of up to 400° C. may prevail within the pressure container of the autoclave.

Independent of whether a mold which is disposed between press plates or a mold which is disposed in an autoclave or oven is used, the apparatus may further be provided with an evacuation device which is adapted to evacuate the receiving space of the mold. The evacuation device may be adapted to evacuate the receiving space of the mold prior to the injection of the plastic material into the receiving space of the mold in order to allow a rapid and bubble-free filling of the receiving space of the mold with the plastic material. The evacuation device may, however, also be adapted to extract gas from the receiving space of the mold during the pressing or autoclave process in order to remove excess air or gases developing during heating or curing of the plastic material from the plastic material.

The heat source which is in thermal contact with the first end of each heat pipe may comprise at least one of the heating device adapted to supply heat to the mold in order to heat the plastic material accommodated within the receiving space of the mold and an additional heating device. For example, the heat source may be formed by the heating device which also is adapted to supply heat to the mold in order to heat the plastic material accommodated within the receiving space of the mold. The apparatus then may comprise only the heating device, wherein the heat pipes provide for an enhanced and more homogeneous distribution of the heat provided by the heating device. Alternatively, the heat source may be formed by an additional heating device which provides additional heat to be transferred to the receiving space of the mold via the heat pipes. Finally, it is conceivable that the first end of the heat pipes is in thermal contact with both the heating device adapted to supply heat to the mold in order to heat the plastic material accommodated within the receiving space of the mold and an additional heating device.

In an apparatus for producing a composite material aircraft component which is equipped with an additional heating device, the additional heating device may comprise a recuperation device. The recuperation device may be adapted to recover exhaust heat of the heating device adapted to supply heat to the mold in order to heat the plastic material accommodated within the receiving space of the mold. This allows a particularly efficient use of the heat provided by the heating device.

The recuperation device may comprise a heat exchanger which is adapted to be flown through with hot exhaust gas of the heating device. For example, the recuperation device may comprise a heat exchanger which is adapted to be flown through with hot exhaust gas of an oven or autoclave heating device.

In the apparatus for producing a composite material aircraft component, the heat pipes may extend through the mold between the heat source and the receiving space of the mold. Such a configuration of the heat pipes is particularly suitable for use in a mold which is disposed between press plates and which is provided with an injection channel and hence particularly suitable for use in an RTM process.

Alternatively or additionally thereto, the heat pipes may extend along an outer surface of the mold between the heat source and a cold spot region of the outer surface of the mold. In the context of the present application, the term "cold spot region" should designate a region of the outer surface of the mold which has a lower temperature than other regions of the surface of the mold. The local temperature gradient across the outer surface of the mold may be caused by a temperature gradient within a heated press plate or within an autoclave or oven. In an autoclave or oven, a temperature gradient may develop, for example, in dependence on the flow characteristics of hot gas within the autoclave or oven.

Heat pipes which extend along an outer surface of the mold between the heat source and a cold spot region of the outer surface of the mold are particularly suitable for use in an apparatus, wherein the mold is disposed in an autoclave or an oven, since, in dependence of the characteristics of flow of the hot gas within the oven or autoclave, typically a temperature gradient develops on the outer surface of the mold. For example, regions of the outer surface of the mold which are more distant to a hot gas inlet of the autoclave or oven may have a lower temperature than regions of the outer surface of the mold which are closer to a hot gas inlet of the autoclave or oven. By means of the heat pipes, the development of a local temperature gradient thus can be prevented. As a result, a more homogeneous heating of the mold and thus a more homogeneous heating of the plastic material accommodated within the receiving space of the mold is achieved. High quality composite material aircraft components thus can be manufactured at short cycle times.

In a method for producing a composite material aircraft component, a plastic material is accommodated in a receiving space of a mold. Heat generated by a heating device is supplied to the mold in order to heat the plastic material accommodated within the receiving space of the mold. Finally, heat is supplied to the plastic material accommodated within the receiving space of the mold, wherein the heat is transferred to the receiving space from a heat source via a plurality of heat pipes, each heat pipe having a first end which is in thermal contact with the heat source and a second end which is in thermal contact with the receiving space.

The plastic material may be injected into the receiving space of the mold via an injection channel provided in the mold. Alternatively or additionally thereto, a pressure may be applied to the mold via press plates sandwiching the mold.

The mold may be disposed in an autoclave or an oven.

The heat source being in thermal contact with the first end of each heat pipe may comprise at least one of the heating device supplying heat to the mold in order to heat the plastic material accommodated within the receiving space of the mold and an additional heating device.

The additional heating device may comprise a recuperation device recovering exhaust heat of the heating device supplying heat to the mold in order to heat the plastic material accommodated within the receiving space of the mold.

The recuperation device may comprise a heat exchanger which is flown through with hot exhaust gas of the heating device.

The heat pipes may extend through the mold between the heat source and the receiving space of the mold. Alternatively or additionally thereto, the heat pipes may extend along an outer surface of the mold between the heat source and a cold spot region of the outer surface of the mold.

It is to be understood that the aspects of the present invention described above may be combinable and that other advantages and aspects of the present invention will become apparent upon reading the following description of the drawings and detailed description of the preferred embodiments.

BRIEF DESCRIPTION OF THE DRAWINGS

Preferred embodiments of the invention now are described in more detail with reference to the appended schematic drawings, wherein.

DETAILED DESCRIPTION OF THE PREFERRED EMBODIMENTS

Figure 1:
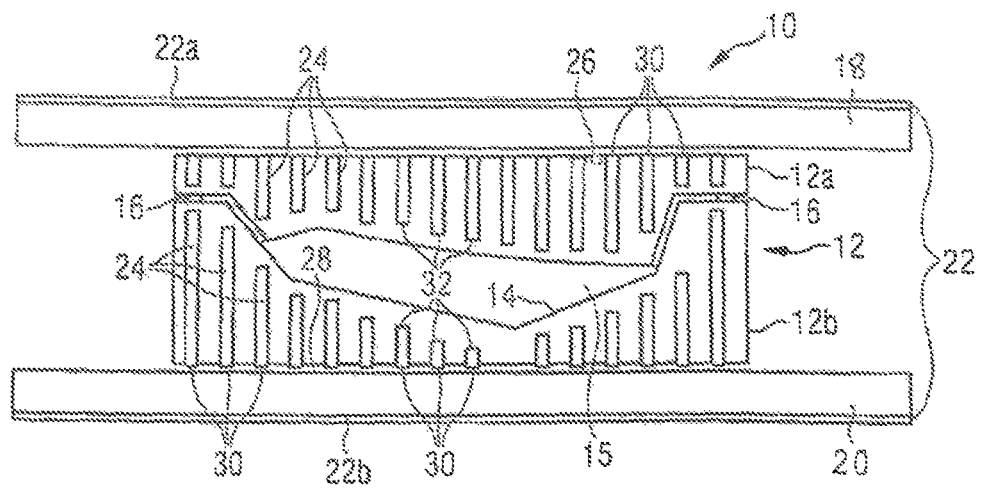
FIG. 1 shows a first embodiment of an apparatus for producing a composite material aircraft component.

FIG. 1 shows a first embodiment of an apparatus 10 which is suitable for producing a composite material aircraft component. The apparatus 10 according to FIG. 1 comprises a mold 12 having a first section 12a and a second section 12b. A receiving space 14 is formed between the first and the second section 12a, 12b of the mold 12, the receiving space 14 being adapted to accommodate a plastic material 15. Further, injection channels 16 are formed in the mold 12 through which the plastic material 15, e.g. a thermoset plastic material, in the liquid state may be injected into the receiving space 14 of the mold 12.

The first and the second mold section 12a, 12b are separable from each other.

Hence, a reinforcing material, for example reinforcing fibers, may be inserted into the receiving space 14 of the mold 12 prior to the injection of the plastic material 15. Further, the first and the second mold section 12a, 12b may be separated from each other in order to remove a molded padding from the receiving space 14 of the mold 12.

The mold 12 is sandwiched between a first and a second press plate 18, 20. Both press plates 18, 20 are heated by means of a heating device 22, the heating device comprising a first section 22a associated with the first press plate 18 and a second section 22b associated with the second press plate 20. The heating device 22 serves to supply heat to the mold 12 in order to heat the plastic material 15 accommodated within the receiving space 14 of the mold 12. In case the plastic material 15 is a thermoset plastic material, the material 15 is cured due to the heat supplied to the mold 12.

Finally, a plurality of blind holes is formed in both the first and the second mold section 12a, 12b. Each blind hole receives a heat pipe 24. Each heat pipe 24 comprises a hermetically sealed tube made of the thermally conductive material such as, for example, a metal. A working medium is contained in the tube of each heat pipe 24.

The heat pipes 24 extend through the mold 12 substantially parallel to each other and substantially perpendicular to press surfaces 26, 28 of the first and the second press plate 18, 20, respectively. Thus, first ends 30 of the heat pipes 24 are in thermal contact with the heated press plates 18, 20 and hence with the respective sections 22a, 22b of the heating device 22. Further, the shape and the size, in particular the length of the heat pipes 24 are designed such that second ends 32 of the heat pipes 24 are in thermal contact with the receiving space 14 of the mold 12.

During operation of the apparatus 10, the press plates 18, 20 are heated by means of the heating device 22. The heat supplied to the press plates 18, 20 is transferred to the mold 12 which is made from a thermally conductive material such as, for example, a metal. Additionally, the heat supplied to the press plates 18, 20 by the heating device 22 causes the working medium contained in the tubes of the heat pipes 24 to evaporate. In particular, the working medium evaporates in a region of the first ends 30 of the heat pipes 24 which are in thermal contact with the heated press plates 18, 20 and hence the respective sections 22a, 22b of the heating device 22. The pressure increase in the region of the first ends 30 of the heat pipes 24 due to the evaporation of the working medium causes a flow of gaseous working medium through the heat pipes 24 in the direction of the second ends 32 of the heat pipes 24. In the region of the second ends 32 of the heat pipes 24, the working medium condenses upon releasing thermal energy. Hence, the heat pipes 24 supply the receiving space 14 and consequently the plastic material 15 accommodated within the receiving space 14 with heat which is transferred to the receiving space 14 from the heating device 22 via the heat pipes 24.

The apparatus 10 shown in FIG. 1 is not provided with an additional heat source. Instead, the heating device 22 is the only source of heat provided in the apparatus 10. The heat pipes 24, however, nevertheless provide for a rapid and very homogenous heating of the plastic material 15 accommodated within the receiving space 14 of the mold 12. Hence, high quality composite material aircraft components can be produced within short cycle times.

Figure 2:
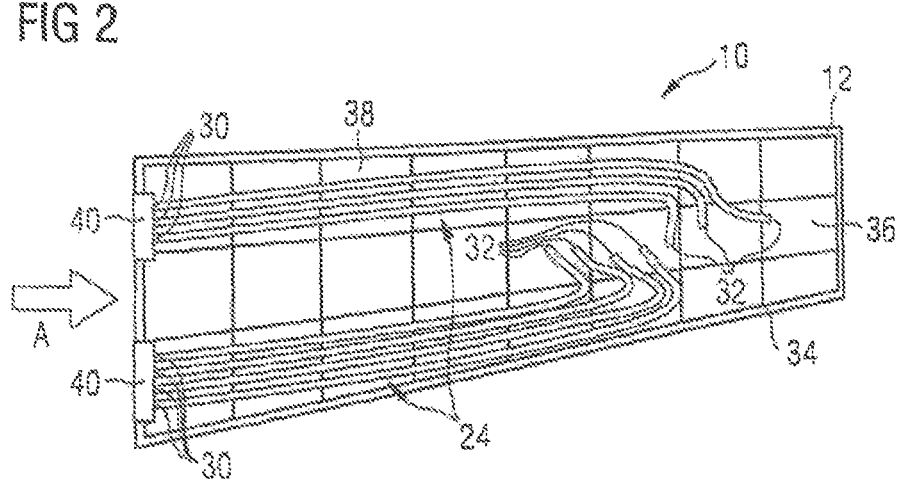
FIG. 2 shows a second embodiment of an apparatus for producing a composite material aircraft component.

FIG. 2 shows a second embodiment of an apparatus 10 for producing composite material aircraft components. The apparatus 10 according to FIG. 2 comprises a mold 12 which is disposed within an autoclave or oven (not shown in the drawing). The mold 12 again comprises a receiving space (not shown) which is adapted to accommodate a plastic material, in particular a thermoset plastic material, and an optional reinforcing material, for example in the form of reinforcing fibers. A heating device (also not shown) of the autoclave or oven supplies heat to the mold 12 in order to heat and in particular cure the plastic material accommodated within the receiving space of the mold 12.

Within the autoclave or oven, the mold 12 is supported by means of a supporting structure 34. The direction of flow of a hot air flow flowing through the autoclave or oven is indicated by an arrow A. The flow characteristics of the hot air flow cause the development of a temperature gradient within the autoclave or oven which in turn causes the development of a cold spot region 36 on an outer surface 38 of the mold 12. In the cold spot region 36, the temperature of the outer surface 38 of the mold is lower than in the remaining regions of the outer surface 38 of the mold 12.

The apparatus 10 is provided with heat pipes 24. A first end 30 of each heat pipe 24 is in thermal contact with a heat source, which, in the embodiment of an apparatus 10 according to FIG. 2, is formed by an additional heating device 40. The additional heating device 40 comprises two recuperation devices, wherein each recuperation device consists of a heat exchanger which is flown through with hot exhaust gas of the heating device of the autoclave or oven. Hence, waste heat of the heating device is recovered in order to heat the heat pipes 24 which in turn transfer the heat to the cold spot region 36 formed on the outer surface 38 of the mold 12.

Hence, the apparatus 10 allows a particularly homogeneous heating of a plastic material accommodated within a receiving space of the mold within a short cycle time.

Although certain features of the apparatus 10 in the foregoing have been described in connection with a specific embodiment of the apparatus 10, these features can also be employed in another embodiment of the apparatus 10. For example, the apparatus 10 according to FIG. 1 may be equipped with an additional heating device and with additional heat pipes for supplying additional heat to a cold spot region formed on an outer surface of the mold. Similarly, the mold of the apparatus 10 depicted in FIG. 2 may be equipped with additional heat pipes extending through the mold.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention and properly come within the scope of our contribution to the art.

The invention claimed is:

1. An apparatus for producing a composite material aircraft component, the apparatus comprising:
    a mold having a receiving space adapted to accommodate a plastic material,
    a heating device adapted to supply heat to the mold in order to heat the plastic material accommodated within the receiving space of the mold,
    a plurality of heat pipes, each heat pipe having a first end which is in thermal contact with a heat source and a second end which is in thermal contact with the receiving space of the mold, such that the plastic material accommodated within the receiving space is supplied with heat transferred to the receiving space from the heat source via the plurality of heat pipes, and
    an additional heating device comprising a recuperation device being adapted to recover exhaust heat of the heating device and adapted to supply heat to the mold in order to heat the plastic material accommodated within the receiving space of the mold,
    wherein the recuperation device comprises a heat exchanger which is adapted to be flown through with hot exhaust gas of the heating device.

2. The apparatus according to claim 1, wherein the mold is disposed between press plates.

3. The apparatus according to claim 1, wherein the mold is provided with an injection channel which allows the plastic material to be injected into the receiving space of the mold.

4. The apparatus according to claim 1, wherein the mold is disposed in an autoclave or an oven.

5. The apparatus according to claim 1, wherein the heat source being in thermal contact with the first end of each heat pipe comprises at least one of the heating device adapted to supply heat to the mold in order to heat the plastic material accommodated within the receiving space of the mold and the additional heating device.

6. The apparatus according to claim 1, wherein the heat pipes extend through the mold between the heat source and the receiving space of the mold.

7. The apparatus according to claim 1, wherein the heat pipes extend along an outer surface of the mold between the heat source and a cold spot region of the outer surface of the mold.

8. A method for producing a composite material aircraft component, the method comprising the steps:
    accommodating a plastic material in a receiving space of a mold,
    supplying heat generated by a heating device to the mold in order to heat the plastic material accommodated within the receiving space of the mold,
    supplying heat to the plastic material accommodated within the receiving space of the mold, the heat being transferred to the receiving space from a heat source via a plurality of heat pipes, each heat pipe having a first end which is in thermal contact with the heat source and a second end which is in thermal contact with the receiving space,
    wherein the heat source comprises an additional heating device comprising a recuperation device recovering exhaust heat of the heating device and being adapted to supply heat to the mold in order to heat the plastic material accommodated within the receiving space of the mold,
    wherein the recuperation device comprises a heat exchanger which is flown through with hot exhaust gas of the heating device.

9. The method according to claim 8, wherein the plastic material is injected into the receiving space of the mold via an injection channel provided in the mold.

10. The method according to claim 8, wherein pressure is applied to mold via press plates sandwiching the mold.

11. The method according to claim 8, wherein the mold is disposed in an autoclave or an oven.

12. The method according to claim 8, wherein the heat source being in thermal contact with the first end of each heat pipe comprises at least one of the heating device supplying heat to the mold in order to heat the plastic material accommodated within the receiving space of the mold.

13. The method according to claim 8, wherein the heat pipes extend through the mold between the heat source and the receiving space of the mold.

14. The method according to claim 8, wherein the heat pipes extend along an outer surface of the mold between the heat source and a cold spot region of the outer surface of the mold.

* * * * *